United States Patent
Feris et al.

(10) Patent No.: US 10,489,043 B2
(45) Date of Patent: Nov. 26, 2019

(54) COGNITIVE GRAPHICAL CONTROL ELEMENT

(71) Applicant: International Business Machines Corporation, Armonk, NY (US)

(72) Inventors: Rogerio S. Feris, Hartford, CT (US); James R. Kozloski, New Fairfield, CT (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 14/969,484

(22) Filed: Dec. 15, 2015

(65) Prior Publication Data

US 2017/0168703 A1 Jun. 15, 2017

(51) Int. Cl.
*G06F 3/0485* (2013.01)
*G06F 3/01* (2006.01)
*G06K 9/00* (2006.01)

(52) U.S. Cl.
CPC .......... *G06F 3/04855* (2013.01); *G06F 3/011* (2013.01); *G06F 3/013* (2013.01); *G06K 9/00315* (2013.01); *G06K 9/00604* (2013.01)

(58) Field of Classification Search
CPC ....................................................... G06F 3/048
See application file for complete search history.

(56) References Cited

U.S. PATENT DOCUMENTS

| | | | |
|---|---|---|---|
| 6,252,594 B1 | 6/2001 | Xia et al. | |
| 6,882,354 B1 * | 4/2005 | Nielsen | G06F 3/013 715/784 |
| 7,398,477 B2 | 7/2008 | Accot | |
| 7,471,284 B2 | 12/2008 | Bathiche et al. | |
| 7,908,554 B1 * | 3/2011 | Blattner | G06Q 10/107 715/706 |
| 8,643,680 B2 | 2/2014 | Baldwin et al. | |
| 2002/0054084 A1 * | 5/2002 | Udell | G06F 16/957 715/738 |
| 2003/0046401 A1 * | 3/2003 | Abbott | G06F 9/4443 709/228 |
| 2008/0091515 A1 * | 4/2008 | Thieberger | G06Q 10/04 705/7.11 |
| 2008/0091635 A1 * | 4/2008 | James | G06F 3/04847 345/473 |
| 2008/0178116 A1 | 7/2008 | Kim | |

(Continued)

FOREIGN PATENT DOCUMENTS

WO    2008019701 A2    2/2008

OTHER PUBLICATIONS

M. Kumar et al., "Gaze-Enhanced Scrolling Techniques," Proceedings of the Conference on Human Factors in Computer Systems (CHI), Apr.-May 2007, pp. 2531-2536.

*Primary Examiner* — Ryan F Pitaro

(74) *Attorney, Agent, or Firm* — Anthony Curro; Ryan, Mason & Lewis, LLP

(57) ABSTRACT

Information relating to at least one of a user and a user environment is acquired. A user cognitive state is determined based on the acquired information. A graphical control element is automatically configured based on the user cognitive state. The graphical control element is automatically presented on a display interface of a user device to control viewing of content displayed on the user device.

20 Claims, 7 Drawing Sheets

(56) References Cited

U.S. PATENT DOCUMENTS

| | | | |
|---|---|---|---|
| 2009/0015568 A1* | 1/2009 | Koski | G06F 3/04855 345/184 |
| 2011/0041077 A1* | 2/2011 | Reiner | A61B 5/411 715/745 |
| 2011/0163978 A1* | 7/2011 | Park | G06F 3/016 345/173 |
| 2013/0055150 A1* | 2/2013 | Galor | G09G 5/34 715/784 |
| 2013/0132854 A1* | 5/2013 | Raleigh | G06F 3/0482 715/738 |
| 2013/0311925 A1* | 11/2013 | Denker | G06F 3/013 715/771 |
| 2013/0311941 A1* | 11/2013 | Fields | G06F 3/04883 715/800 |
| 2014/0143694 A1* | 5/2014 | Tapley | G06F 3/0481 715/765 |
| 2014/0223358 A1* | 8/2014 | Park | G06F 3/0488 715/786 |
| 2015/0012813 A1 | 1/2015 | Naderi | |
| 2015/0235127 A1* | 8/2015 | Kim | G06N 5/025 706/12 |
| 2015/0279227 A1* | 10/2015 | Huber | G09B 7/06 434/353 |
| 2016/0086020 A1* | 3/2016 | Bigos | G06F 3/0482 715/703 |
| 2016/0147425 A1* | 5/2016 | Baughman | G06F 3/04847 715/745 |
| 2016/0188148 A1* | 6/2016 | Lee | H04N 5/4403 715/719 |
| 2016/0378201 A1* | 12/2016 | Baughman | G06F 8/38 345/173 |
| 2016/0378286 A1* | 12/2016 | Ke | G06F 3/017 715/764 |
| 2017/0316707 A1* | 11/2017 | Lawrenson | G06F 9/4446 |
| 2018/0107557 A1* | 4/2018 | Kim | G06F 11/1415 |

\* cited by examiner

COGNITIVE GRAPHICAL CONTROL ELEMENT

BACKGROUND

As the use of electronic devices to access various types of content (e.g., news articles, websites, videos, digital books, etc.) increases, users often encounter large amounts of displayed data. Commonly, users may navigate the content via a graphical control element, such as a scrollbar. Navigation through the vast amount of content using a scrollbar may require scrolling through data one record at a time, paging up and down, various flicking methods, or dragging a cursor or thumb across a display to find sought after data.

SUMMARY

Embodiments of the invention provide techniques for adjusting a graphical control element based on a cognitive state of a user.

For example, in one embodiment, a method comprises the following steps. Information relating to at least one of a user and a user environment is acquired. A user cognitive state is determined based on the acquired information. A graphical control element is automatically configured based on the user cognitive state. The graphical control element is automatically presented on a display interface of a user device to control viewing of content displayed on the user device.

DETAILED DESCRIPTION

Figure 1:
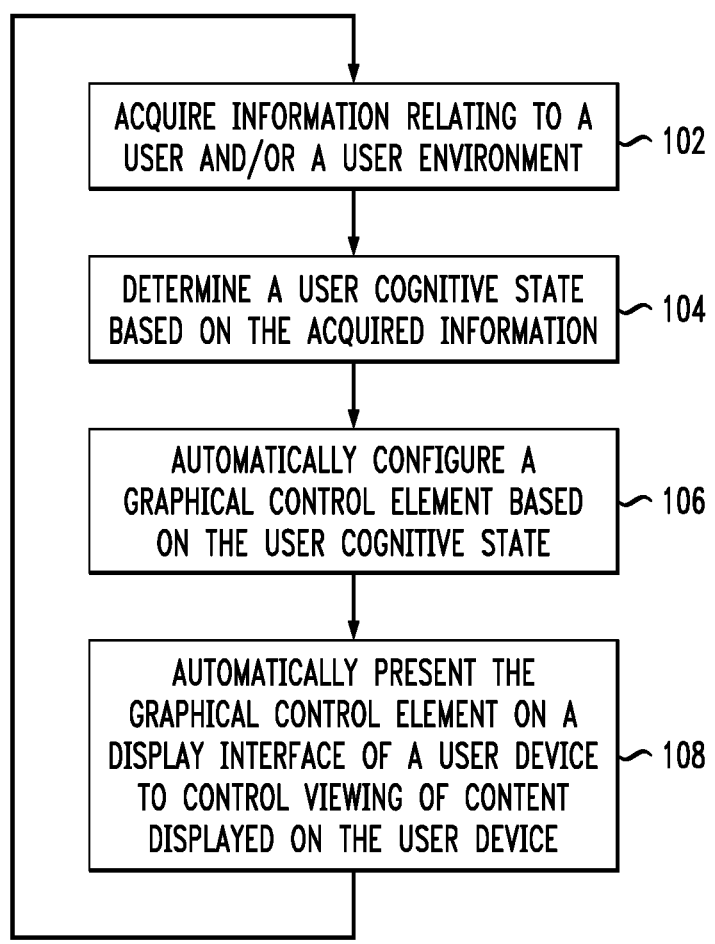
FIG. 1 illustrates an overview process of a methodology for adjusting a graphical control element based on a cognitive state of a user, according to an embodiment of the invention.

Illustrative embodiments of the invention may be described herein in the context of illustrative methods, systems and devices for adjusting a graphical control element, more particularly, for adjusting a scrollbar based on the cognitive state of a user. However, it is to be understood that embodiments of the invention are not limited to the illustrative methods, systems and devices but instead are more broadly applicable to other suitable methods, systems and devices.

A scrollbar is a graphical control element with which content, such as text, images, and video can be navigated. Scrollbars may appear on various electronic devices, such as computer displays, graphing calculators, mobile phones and portable media players. Scrollbars may also appear on one or more sides of a viewing area on an electronic device. Certain scrollbars may do more than scroll, such as zooming in/out. Sometimes, a scrollbar may appear as a "thumb" or "puck" that can be dragged along a track. Sometimes, the size of the thumb can be fixed or variable. These graphical user interface (GUI) elements may be different from a conventional scrollbar in that sliders are used to change values (not necessarily for scrolling through a viewport).

However, while scrollbars may be useful for various applications, navigating content can be difficult when the content is hard to decipher (e.g., small font size, tight spacing, colorful), or if the user is elderly or has poor vision. Furthermore, a user may require or prefer different scrolling speeds for navigating content depending on the situation. For example, when a user is browsing a website at leisure or studying the content in detail, the user may want the scrolling speed to be slower than normal. As another example, a user may be searching for content for which he or she knows the location on the page and may prefer a faster than normal scrolling speed to reach the desired content location quickly.

Furthermore, while scrollbars may be useful for a broad range of users, a user may become so confused or frustrated due to issues related to scrolling that he or she may think an application is "hung" and terminate the application. Moreover, a conventional scrollbar may itself be difficult to use for those who suffer from poor eyesight, have difficulty focusing on an object, or can only see certain colors.

Embodiments of the invention provide methods and systems for representing a graphical control element, e.g., a scrollbar, on a graphical user interface and adjusting the scrollbar based on the cognitive state of a user. As used herein, "cognitive state" may refer to a user's state of mind, e.g., the user's ability to perceive and/or comprehend content. A person's abilities and cognitive state may vary depending on the context and/or other factors (e.g., level of tiredness, etc.). In various embodiments of the invention, the scrollbar may change in size, color, shape, width, and responsivity to a sliding action (e.g., using a mouse or a finger gesture) based on the user's cognitive state and/or context. As used herein, responsivity may refer to a measure of responsiveness. For example, responsivity may include changes to the sensitivity of a scroll bar, changes to its motion characteristics, changes to a degree of movement of a mouse or finger, or changes based on an amount of pressure applied to the scroll bar by a finger. In one embodiment, scrollbar velocity and acceleration may control the responsiveness when the mouse or finger is moved along the scrollbar or moved along a certain region of the scrollbar, so that the slider itself moves more quickly (or slowly) and goes further in response to the mouse or finger, thus potentially accelerating or decelerating the movement speed and rate of the scrollbar. Other responsiveness changes may include the use of, or disabling of, lags in motion or detents. Responsiveness may also include linearity and nonlinearity effects (e.g., jerky or smoother movements) in response to input controls, such as a mouse or finger.

Advantageously, various embodiments herein provide methods and systems for adapting a graphical control element based on task, user demographic, user's cognitive skills, user context (e.g., device, location, if alone or in the group). As scrollbars have a cognitive component, a user having an easier time of scrolling and/or simpler scrolling experience may prefer a particular application or task and thereby become more engaged or productive.

Referring to the figures, FIG. 1 depicts an overview process of a methodology 100 for representing a graphical control element on a graphical user interface and adjusting the graphical control element based on the cognitive state of a user. Methodology 100 comprises the following steps. At step 102 information relating to a user and/or user environment is acquired. Information may include visual information, such as images or videos of a user and/or user environment, screenshots of the user device, etc. Information may also include acoustic data, such as audio files of a user's environment or voice. Information may further include a user's schedule obtained from a calendar, which may show meetings scheduled for the day or week. Information be acquired using one or more imaging components, acoustic components and/or processor implemented on the user device. Information may also be acquired via user input. For example, a user or a caregiver may input special requirements or characteristics for the user (e.g., the user is a child). Information may also be acquired from a database, which may comprise information relating to characteristics of one or more cohorts and/or users and/or historical data for one or more cohorts and/or one or more users).

At step 104, the user's cognitive state is determined based on the acquired information. The cognitive state may include an emotional state (e.g., fatigue, frustration, anger, and happiness), distraction level, degree of information assimilation (e.g. skimming text), etc. The state may also be related to a user demographic, type, and/or cohort (e.g., autism, age, pre-Alzheimer's disease, cognitive style, etc.). In some embodiments, a user state may be inferred by facial expression monitoring or by setting of a user demographic by a caregiver or third party. The cognitive state may also be inferred by user biometrics (e.g., face/voice recognition), noise levels in the environment, eye gaze tracking, forecast interest, possible distractions caused by number of open activities (e.g. windows) on a computer desktop, concurrent use of other devices (e.g., phone), possible fatigue based on meeting schedules for the day (e.g., on an electronic calendar), input from wearable devices, location context, time of day, etc.

At step 106, the graphical control element can be configured and adjusted based on the user's cognitive state determined at step 104. For example, the size of a scrollbar may be increased if the user is elderly, the color may change if the user is distracted, or the style of the scrollbar may be switched to be in the form of a cartoon character if the user is a child. The representation/responsivity of a scrollbar may also change based on eye gaze tracking or forecast interest in content on the screen. For example, if the user is carefully reading content on the screen as determined by slower than normal eye gaze movement, the scrollbar speed may be decreased compared to a normal/default scrolling speed to accommodate the user. Optionally, the graphical control element may also be changed based on user context and/or user cognitive state as impacted by the user context. For example, the graphical control element may become wider, thinner, longer, or shorter based on a user's estimated level of distraction due to the user's environment.

At step 108, the configured/adjusted graphical control element may be presented to a user on a display interface of the user device. The user may then use the adjusted graphical control element to control viewing of the content on the user device. A user device may include a tablet, a smartphone, a laptop or any other suitable electronic or computing device configured with a graphical control element.

Figure 2:
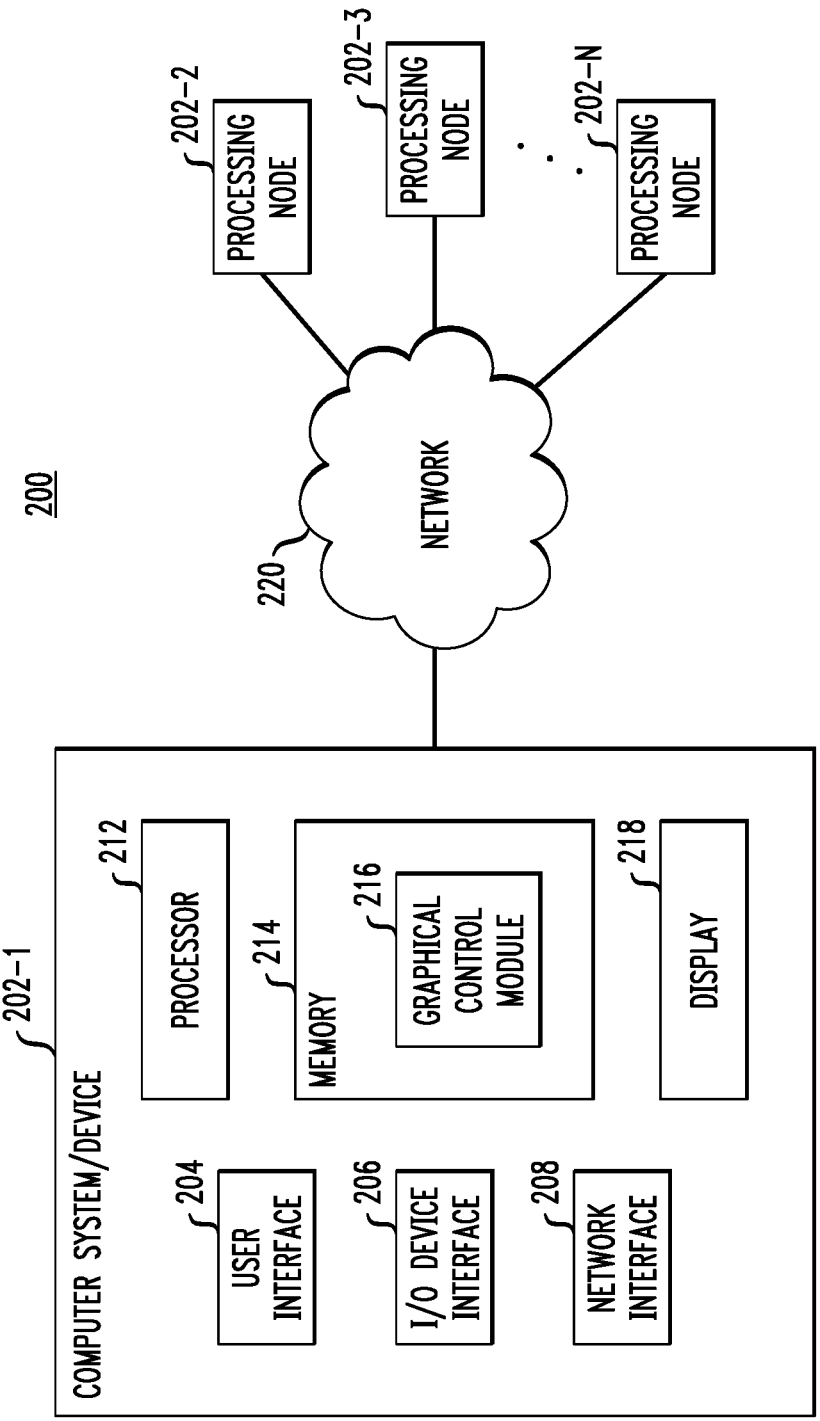
FIG. 2 illustrates an exemplary embodiment of a distributed network 200 in which the methodology 100 of FIG. 1 may be implemented.

FIG. 2 depicts a distributed network 200 for implementing methodology 100 of FIG. 1. Distributed network 200 comprises one or more processing nodes 202-1 . . . 202-N configured for communication through network 220. Each of the processing nodes 202-1 . . . 202-N may be configured with components similar to computer system/server 202-1, which may comprise, but is not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 202-1 may include a user interface 204, an input/output (I/O) device interface 206, a network interface 210, one or more processors 212 coupled to a memory 214 and a display 218.

User interface 204 may be configured to enable user input into the computer system/device 202-1 (e.g., a user device). I/O device interface 206 may support communication with a variety of I/O devices. For example, user input/output devices (such as hand-held devices and computing devices) and user input devices (such as a keyboard, mouse, keypad, touchpad, light pen, or other pointing devices). Network interface 208 may be configured to enable the computer system/device 202-1 to interface with a network 220 and other system components in a distributed network.

Memory 214 may include a random-access semiconductor memory, storage device, or storage medium (either volatile or non-volatile) for storing or encoding data and programs. Memory 214 may also comprise a graphical control module 216 for implementing at least a portion of methodology 100 of FIG. 1, details of which is delineated in the context of FIG. 3.

The display device 218 may be a standalone display screen, computer monitor, television, a tablet or handheld device display, or other suitable displayable device configured to display content to a user. It is to be appreciated that distributed network 200 may include more or less components than shown in FIG. 2. Furthermore, each of the processing nodes 202-1 . . . 202-N may comprise more or less components than shown in computer system/device 202-1.

Figure 3:
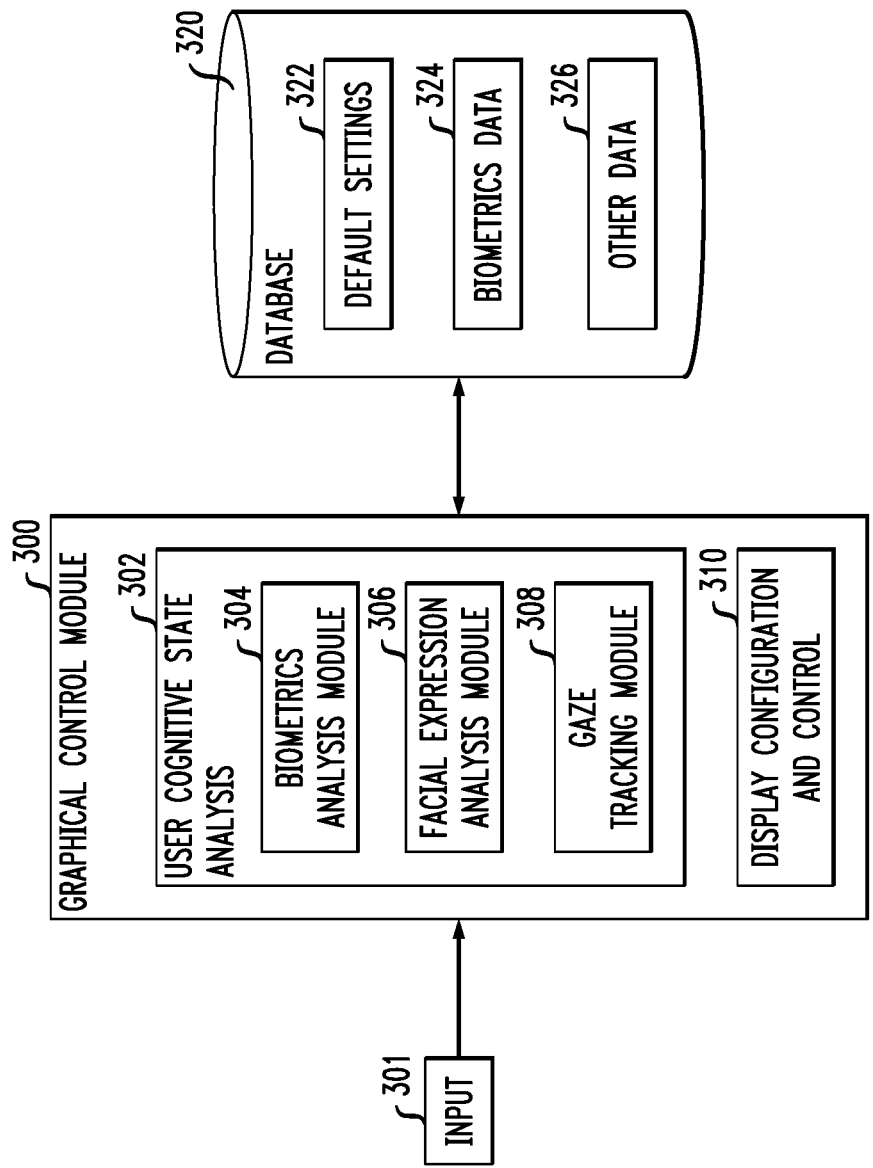
FIG. 3 illustrates an illustrative embodiment of a graphical control module of FIG. 2.

FIG. 3 depicts an illustrative embodiment of a graphical control module 216 shown in FIG. 2. Graphical control module 300 receives input 301, which may comprise information relating to a user or the user's environment. Graphical control module 300 comprises a user cognitive analysis module 302 and a display configuration and control module 310.

Graphical control module 300 may also interact with a database 320 to retrieve and/or store information. Database 320 may be implemented apart from the user device or as part of the user device. Database 320 may include default settings 322, which may include information for default scrollbars for specific users, or default scrollbars for each user type/cohort. Database 320 may also include biometrics data 324, which may include previously-stored biometrics for user types/cohorts and/or specific users. Database 320 may also include other data 326, e.g., historical user data, data pertaining to user types/cohorts, etc.

User cognitive state analysis module 302 may include a biometrics analysis module 304, a facial expression analysis module 306 and a gaze tracking module 308. Biometrics analysis module 304 may interact with database 320 to retrieve and/or store biometrics data 324. Biometrics analysis module 304 may determine user cognitive state by applying biometric-based recognition techniques to input 301. For example, biometrics analysis module may use a voice recognition technique to compare an audio file received as input 301 against audio files stored in database 320 to determine user characteristics or identity.

User cognitive state analysis module 302 may also include facial expression analysis module 306, which may determine user cognitive state based on user facial expressions captured by one or more imaging components on the user device and received by graphical control module 300 as input 301. Facial expression analysis module 306 may also use computer vision to measure eye blink rate as a proxy for fatigue. Facial expression analysis module 306 may also apply age estimation methods to one or more user images received as input 301 to automatically categorize a user, e.g., as a child or elderly, and change the scrollbar accordingly. Facial expression analysis can also be used to infer the emotional state of the user. This information (e.g., estimated age, fatigue, emotion) may be used to adjust the scrollbar accordingly. For example, a user who is fatigued may prefer larger scrollbars with slower scrolling speed, while a child may prefer representations with cartoon characters or colorful scrollbars.

User cognitive state analysis module 300 may also include a gaze tracking module 308 for determining user cognitive state based on eye movement. Measurement of eye gaze can be obtained using cameras equipped with infrared illumination, using the reflection on the cornea to calculate the gaze direction. It is also possible to measure eye gaze using off-the-shelf cameras based on machine learning models that map the appearance of the eye to the corresponding gaze locations in the screen. A device may include cameras equipped to measure where the user is looking. Gaze tracking module 308 may use any of the above methods or analyze eye movement using an eye tracking algorithm to analyze one or more images/videos received as input 301.

Graphical control module 300 may also include a display configuration and control module 310 configured to adjust and present a graphical control element on a user device. Display configuration and control module 310 may allow a user to select a particular configuration or set a user profile with respect to a scrolling preference. For example, a user may configure his/her default scrollbar with a specific scrolling speed, scrollbar type, scrollbar size and shape. This customized scrollbar may be stored in database 320 as default settings 322 for this particular user. Display configuration and control module 310 may also adjust or configure a graphical control element based on results from user cognitive state analysis module 302. Display configuration and control module 310 may control various parameters, for example, scrolling speed, size, shape, brightness, etc.

A system implementing an embodiment of the invention may learn what scrollbars are best for different classes of users so that other users can benefit as the system learns. For example, in one embodiment, a user may actually tap on a certain style of scrollbar when the user "likes" it and the system may store this scrollbar style in database 320 for this user as part of the user's profile. As another example, the system may learn and adapt based on characteristics of a cohort or user and/or based on historical data associated with a cohort or user. In other embodiments, the system may determine (with a certain level of confidence) that a user is becoming impatient, or nervous and vary or adapt the scrollbar accordingly.

Illustratively, graphical control module 300 may use computer vision for adaptively changing the representation or responsivity of a scrollbar. Eye gaze tracking performed via gaze tracking module 308 can be used to measure the user reading speed in order to change the parameters of the scrollbar. For example, depending on the reading speed, or the eye gaze location in the screen, the scrollbar may be adjusted to be less/more sensitive. When the system detects erratic eye movement or rapid blinking, which may indicate agitation or fatigue, the speed, size and other attributes of the scrollbar may be adjusted. In addition, when the eyes are looking at the bottom of a page, the look and feel of the scrollbar may also change to indicate end of page. As such, embodiments herein allow the user to control the scrolling while facilitating scrolling via an adaptive scrollbar.

When skimming text, a reader is looking for cues that help him or her incorporate information from the text without sequential reading. This task is best accomplished when a skimming reader slows down and speeds up scrolling depending on the level of interest he or she has in the text that is scrolling past. This act requires two cognitive tasks: 1) assimilating information; and 2) determining if the features passing by are interesting enough to slow down. Certain embodiments of the invention may use a cognitive scrollbar to slow down automatically (e.g., change its responsivity) during fast scrolling based on a model of user interest (or forecast interest) in the features on the screen that are scrolling past. In this way, the user may ignore task (2) noted above and focus instead on incorporating information at a constant rate, modulated by the availability of the information at scrolls past at an automatically determined rate. The rate in these embodiments may be determined based on one or more of: (i) text analytics; (ii) topic analysis; (iii) cognitive profiling and analysis; (iv) wearable signals; (v) user schedule; (vi) cognitive model; and (vii) user email analytics.

For example, graphical control module 300 may monitor a user scrolling through a set of options or material, and at some point, detect that the user may be scrolling too fast compared to the user's reading pace (e.g., via facial expression analysis or gaze tracking) or the system may detect content that the user may be interested in based on forecasted user interest. In this case, the scrolling rate may automatically be adjusted by adjusting the viscosity of the scrollbar. The viscosity of the scrollbar may refer to the consistency of the scrollbar, e.g., the friction level that the scrollbar exhibits, or the perceived resistance when a user is scrolling. Adjusting the viscosity of the scrollbar may be advantageous in certain situations to minimize the risk or likelihood of losing a user's attention.

If an action that is controlled by a scrollbar has a risk level R (i.e., risk of losing the user's attention), then a viscosity coefficient may change to slightly deter the scrolling so as to encourage a user reflecting on his or her act of scrolling. The value of R may affect the value of the coefficient. The force of viscosity on a small sphere moving through a viscous fluid is given by:

$$F_d = 6\pi\mu R V$$

$F_d$ is the frictional force, known as Stokes' drag, acting on the interface between the fluid and the particle, $\mu$ is the dynamic viscosity, R is the radius of the spherical object, and V is the flow velocity relative to the object. In International System of Units (SI units), $F_d$ is given in Newtons, $\mu$ in Pascal-second (Pa·s), R in meters, and V in meters per second (m/s).

Computation of $F_d$ may be performed by display configuration and control module 310. The resulting $F_d$ may be applied to a scrollbar to change the velocity of the scrollbar. As such, the act of fast scrolling may be modified using various embodiments of the invention.

Various embodiments of the invention may involve a scrollbar that is customized for a group of users. For example, a family vacationing in Europe may be using a touch screen panel to learn more about the city and its attractions. A system implementing an embodiment of the invention may detect handovers between parents and children using information captured from one or more imaging components (i.e., a camera unit) on the device, the system may then adjust the scrollbar accordingly. Furthermore, the system can detect that the child may not be tall enough to reach out the touch panel and may present scrollbar options in a voice-based command style options. As another example, if a business team is working on a project, similar or complementary scrollbars may be automatically providing for members of the team. As yet another example, a driver may be using an in-vehicle application offering a selection of destinations, where haptic feedback from sensors placed in the car (on steering wheel, on car dash or seat, etc.) can be used to navigate choices by the driver, thereby removing the need to use the built in touchscreen or relying on input technology.

Figure 4A:
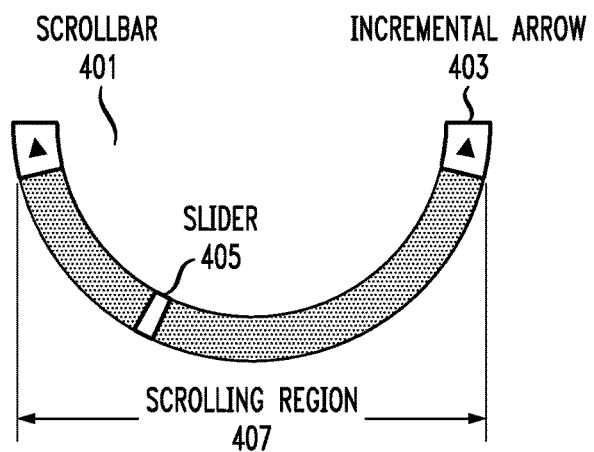
FIG. 4A illustrates an exemplary embodiment of a cognitive scrollbar, according to an embodiment of the invention.
Figure 4B:
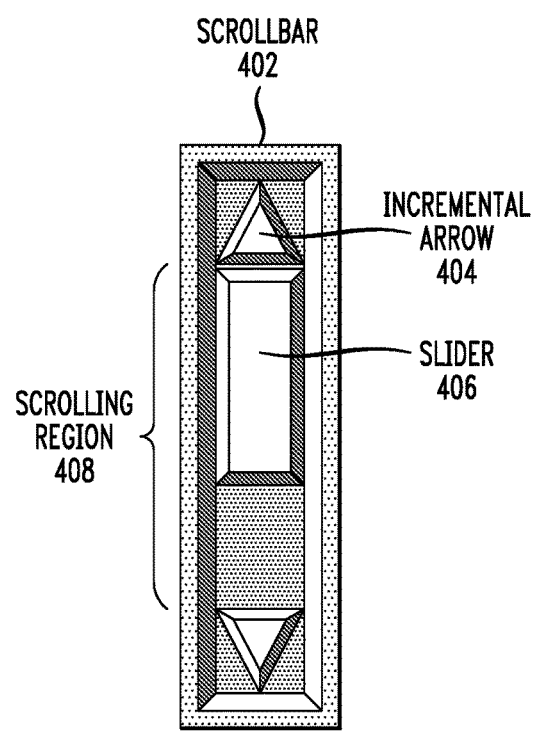
FIG. 4B illustrates an exemplary embodiment of a cognitive scrollbar, according to a different embodiment of the invention.

FIGS. 4A and 4B depict illustrative scrollbars to which embodiments may be applied. FIG. 4A depicts a semi-circular scrollbar 401, which includes incremental arrows 403 on one or both ends of scrolling region 407. Navigation/scrolling may be performed using incremental arrows 403 or slider 405. FIG. 4B depicts a linear scrollbar 402, comprising incremental arrows 404 at one or both ends of scrolling region 408. Navigation/scrolling may be performed using the incremental arrows 404 or slider 406. While not shown, embodiments of the invention may also be implemented with other types of scrollbar, for example, a spiral scrollbar. A spiral scroll involves a non-linear path region that corresponds to a list of items in a computer application, wherein a length of the path region is directly proportional to an amount of items in the list. A rotatable handle region corresponds to a subset of the items in the list.

In some embodiments, adjustment of the scrollbar may include switching the scrollbar type based on a user cognitive state or task. In addition to taking into account the user's cognitive state, various embodiments can also take into an account the context, such as location, device, and type of task/selection being made with slider/scrollbar. Additionally, the type of feedback from GUI control, such as haptic feedback and/or audio feedback, can be further enhanced based on the cognitive state of the user.

Figure 5:
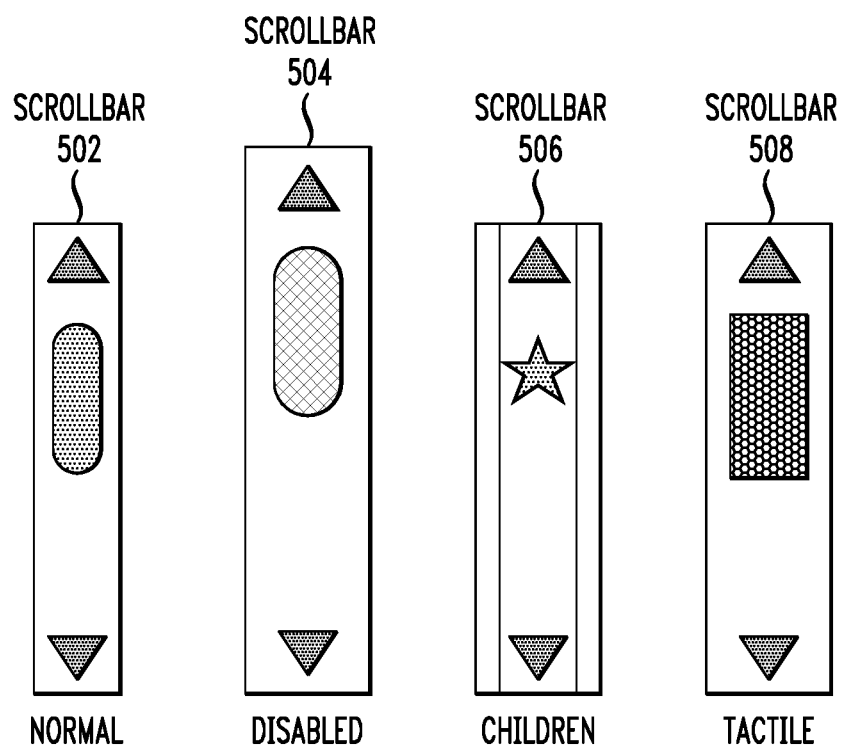
FIG. 5 illustrates exemplary scrollbars for different user cognitive states, according to embodiments of the invention.

FIG. 5 depicts illustrative types of scrollbars that may be implemented for different user groups/types. Scrollbar 502 may be a normal or default linear scrollbar. Scrollbar 504 may be a customized scrollbar for users with disability. Scrollbar 506 may be a scrollbar customized for a specific user cohort, e.g., for children, using shapes and/or character representations in the scrollbar. Scrollbar 508 may be a tactile scrollbar, which may be configured to include tactile properties, such as texture and detents, in one or more parts of the scrollbar (e.g., the slider, the incremental arrows, the entire scrollbar). Typically, a detent is a device or action used to mechanically resist or arrest the rotation of a wheel, axle, or spindle. Scrollbar 508 may be configured with simulated detents such that users may feel "bumps" as they rotate a dial or move a slider. While not shown, various scrollbars may be configured based on context. For example, in one embodiment, a scrollbar may be specifically configured with a page index and a scroll indicator for accessing multi-page data via a user interface.

Various embodiments of this invention may be implemented on a tactile touch-sensitive device for use as an electronic input device for indicating a position of an electronic document on a display. Certain embodiments may involve a scrollbar or touchpad as a touch area on a rigid substrate. The bottom surface of the flexible layer and the top surface of the substrate, eventually in combination with elements disposed there-between may be configured to provide a pattern of varying resistance to depression of the flexible layer. When using a graphical control element on such a device, a user can feel the varying resistance to depression, when moving a fingertip over the touch sensitive surface, thereby receiving tactile feedback. The nature of this varying resistance may depend on context or cognitive state. Furthermore, the elements disposed between the bottom surface of the flexible layer and the top surface of the substrate can be collapsible members such as collapsible domes or switches that produce a "click" sound when collapsing, thus providing both tactile and audible feedback to the user.

Advantageously, certain embodiments of the invention may be helpful for people with special needs, such as elderly computer users, children, users with autism, users with pre-Alzheimer's disease, etc. For example, scrollbar 504 may be implemented as a voice-controlled scrollbar for use by a disabled user (e.g., a user with Parkinson's disease or paralysis). Alternatively, a cognitive scrollbar may be configured with tactile and audible feedback for users with diminished or impaired vision.

In various embodiments, the scrollbar may change its presentation depending on: task, cognitive skills of the user, etc. For example, a different scrollbar may be rendered if the task is "select dish to order" as compared with "select a person to contact on the dating site" or "select destination for your cab ride." Furthermore, systems and methods implementing an embodiment of the invention may also provide visual and/or audio cues in the GUI environment including a window to alert a user that a portion of the document is not currently displayed in the window and these cues may change with cognitive state and context.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention. For example, computer system/device 202-1 may comprise a computer program product for implementing embodiments of the invention disclosed herein.

The computer readable storage medium (e.g., memory 214) can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network (e.g., network 220), including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computer system/servers 202-1 . . . 202-N in FIG. 2 are examples of cloud computing nodes. It is to be appreciated, however, that these computer systems/servers are only examples of suitable cloud computing nodes and is not intended to suggest any limitation as to the scope of use or functionality of embodiments of the invention described herein. Regardless, these computer systems/servers are examples of cloud computing nodes capable of being implemented and/or performing any of the functionality set forth hereinabove.

Figure 6:
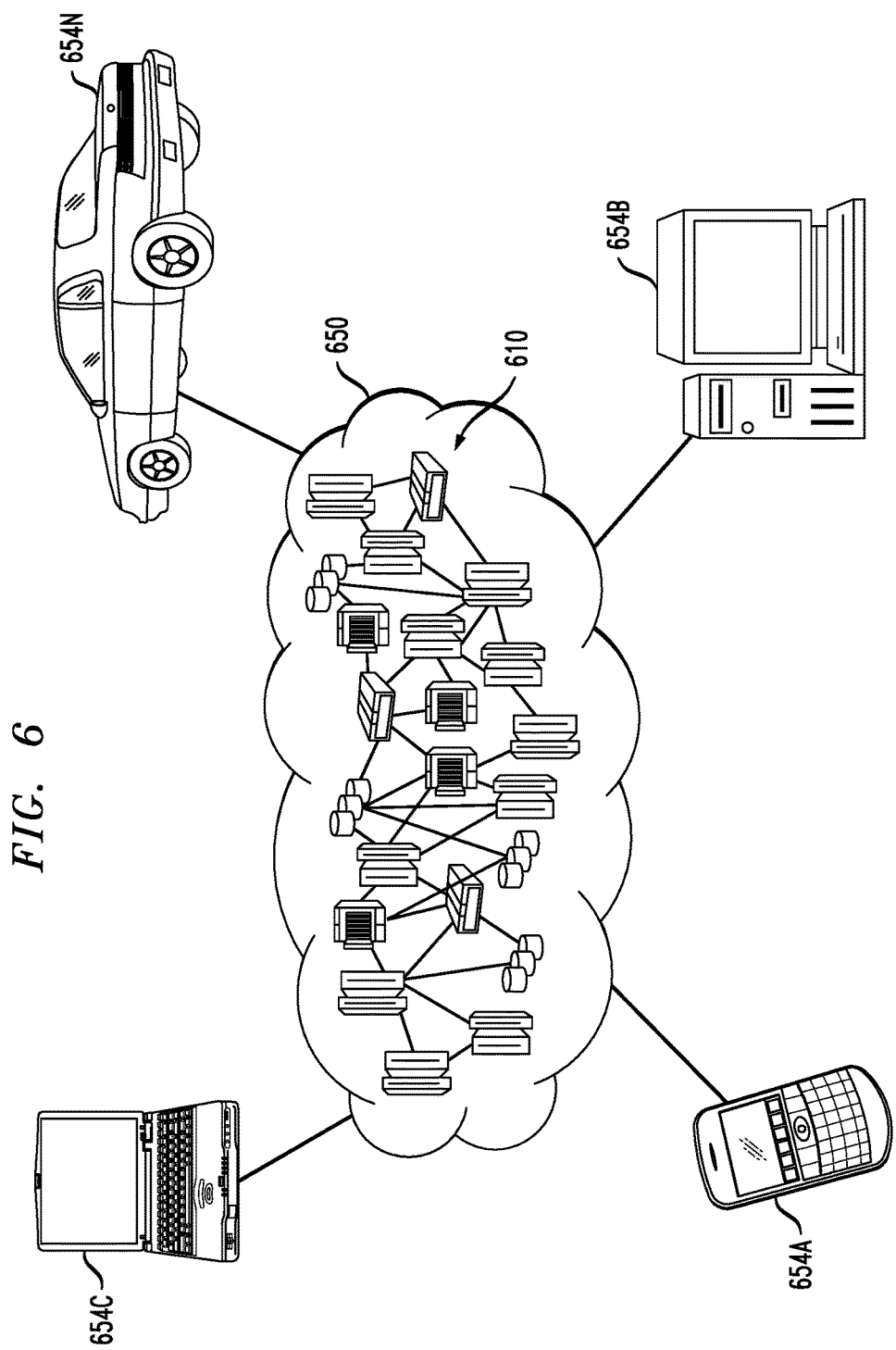
FIG. 6 illustrates a cloud computing environment, according to an embodiment of the invention.

Referring now to FIG. 6, illustrative cloud computing environment 650 is depicted. As shown, cloud computing environment 650 comprises one or more cloud computing nodes 610 with which local computing devices used by cloud consumers, such as, for example, a wearable device (not explicitly shown), a personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
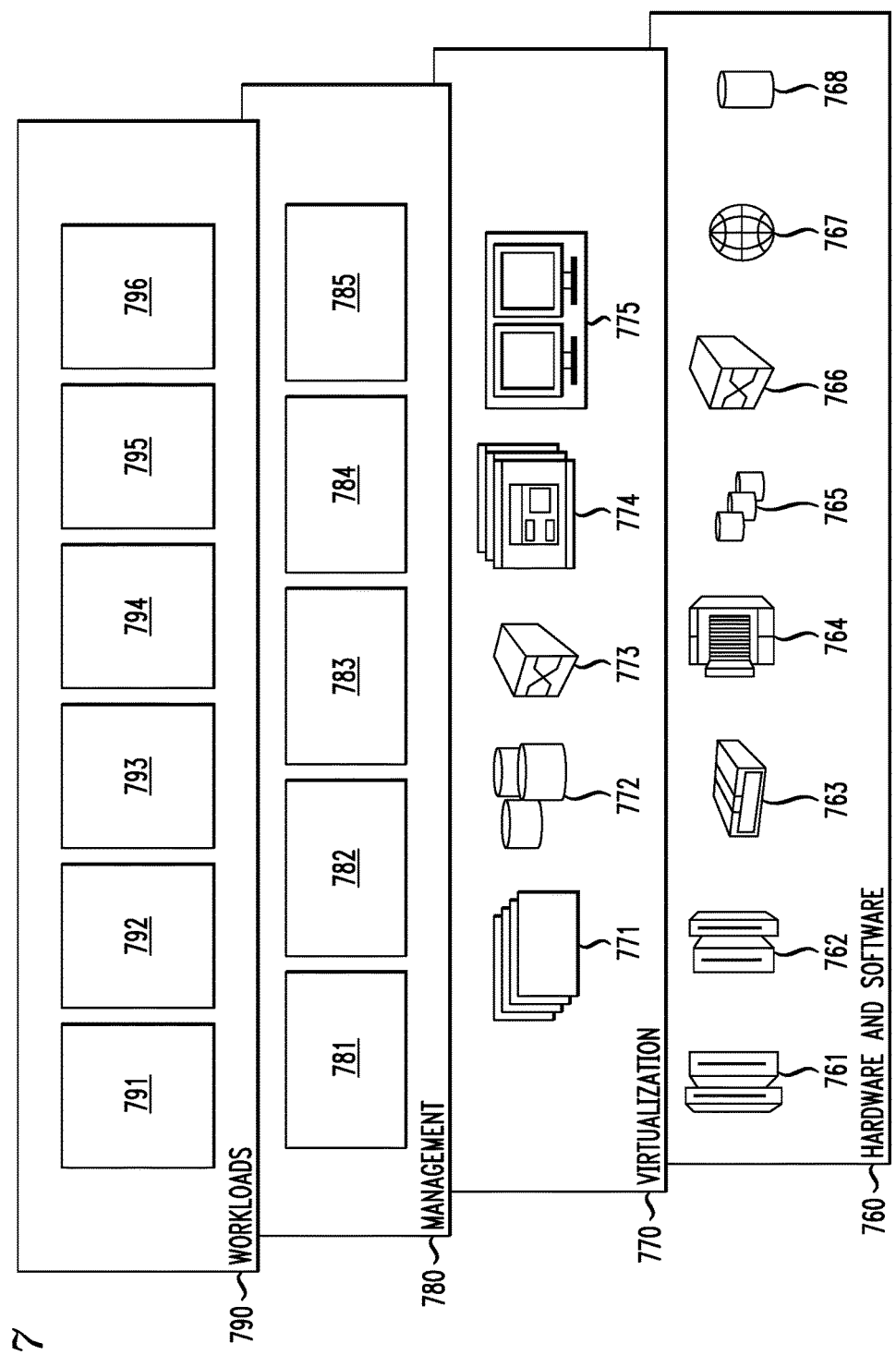
FIG. 7 depicts abstraction model layers according to an embodiment of the invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and graphical control adjustment 796, which may implement one or more functions described above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising steps of:
   acquiring information relating to at least one of a user and a user environment, wherein at least a portion of the information is acquired via user input, and further wherein the acquiring information comprises capturing one or more user images by using one or more imaging components on a user device to estimate an age of the user to categorize the user;
   determining a user cognitive state based on the acquired information, wherein the user cognitive state comprises at least a user demographic;
   automatically configuring a graphical control element based on the user cognitive state, wherein the graphical control element comprises a scrollbar and further wherein automatically configuring the graphical control element comprises adjusting at least one of a shape and a texture of a slider of the scrollbar; and
   automatically presenting the graphical control element on a display interface of a user device to control viewing of content displayed on the user device;
   wherein the steps are performed by at least one processor device coupled to a memory implemented in the user device.

2. The method of claim 1, wherein the user cognitive state further comprises at least one of a user cohort, a user emotional state and a user distraction level.

3. The method of claim 2, wherein the user emotional state comprises at least one of fatigue, frustration, confusion and interest.

4. The method of claim 1, wherein determining the user cognitive state comprises analyzing the one or more images of the user utilizing at least one of a biometric technique, a facial expression analysis technique and a gaze tracking technique.

5. The method of claim 1, wherein the step of acquiring information further comprises acquiring information relating to the user environment.

6. The method of claim 1, wherein the step of acquiring information further comprises acquiring information relating to the user environment and capturing one or more audio streams of the user environment using one or more acoustic components on the user device.

7. The method of claim 1, wherein the step of acquiring information further comprises acquiring information relating to the user environment and acquiring user activity level based on at least one of a number of open windows on the user device and a user activity schedule from a calendar using one or more processors implemented in the user device.

8. The method of claim 1, wherein automatically configuring the graphical control element comprises adjusting a responsivity level of the scrollbar.

9. The method of claim 8, wherein adjusting the responsivity level of the scrollbar comprises changing a viscosity of scrolling based on a risk computation.

10. The method of claim 1, wherein the information is acquired from a database comprising characteristics of one or more cohorts, characteristics of one or more users and historical data associated with the one or more cohorts and one or more users.

11. The method of claim 10, further comprising learning the user cognitive state based on at least one of the characteristics and the historical data.

12. The method of claim 1, further comprising automatically configuring the graphical control element based on a user context.

13. The method of claim 1, further comprising repeating the acquiring step, monitoring the user cognitive state periodically.

14. The method of claim 13, further comprising automatically reconfiguring the graphical control element periodically.

15. The method of claim 1, wherein the automatically configuring the graphical control element further comprises adjusting a color.

16. A device comprising:
    a memory and a processor operatively coupled to the memory and configured to implement the steps of:
    acquiring information relating to at least one of a user and a user environment wherein at least a portion of the information is acquired via user input and further wherein the acquiring information comprises capturing one or more user images by using one or more imaging components on a user device to estimate an age of the user to categorize the user;
    determining a user cognitive state based on the acquired information, wherein the user cognitive state comprises at least a user demographic;
    automatically configuring a graphical control element based on the user cognitive state, wherein the graphical control element comprises a scrollbar and further wherein automatically configuring the graphical control element comprises adjusting at least one of a shape and a texture of a slider of the scrollbar; and
    automatically presenting the graphical control element on a display interface of a user device to control viewing of content displayed on the user device.

17. The device of claim 16, wherein the automatically configuring the graphical control element further comprises adjusting a color.

18. The device of claim 16, further comprising automatically configuring the graphical control element based on a user context.

19. A computer program product comprising a computer readable storage medium for storing computer readable program code which, when executed, causes a computer to:
- acquire information relating to at least one of a user and a user environment wherein at least a portion of the information is acquired via user input, and further wherein the acquiring information comprises capturing one or more user images by using one or more imaging components on a user device to estimate an age of the user to categorize the user;
- determine a user cognitive state based on the acquired information, wherein the user cognitive state comprises at least a user demographic;
- automatically configure a graphical control element based on the user cognitive state, wherein the graphical control element comprises a scrollbar and further wherein automatically configuring the graphical control element comprises adjusting at least one of a shape and a texture of a slider of the scrollbar; and
- automatically present the graphical control element on a display interface of a user device to control viewing of content displayed on the user device.

20. The computer program product of claim 19, wherein the automatically configuring the graphical control element further comprises adjusting a color.

* * * * *